April 27, 1954  J. E. RICHTER  2,676,664
STEERING APPARATUS FOR MOTOR POWERED VEHICLES
Filed Feb. 25, 1952  2 Sheets-Sheet 1
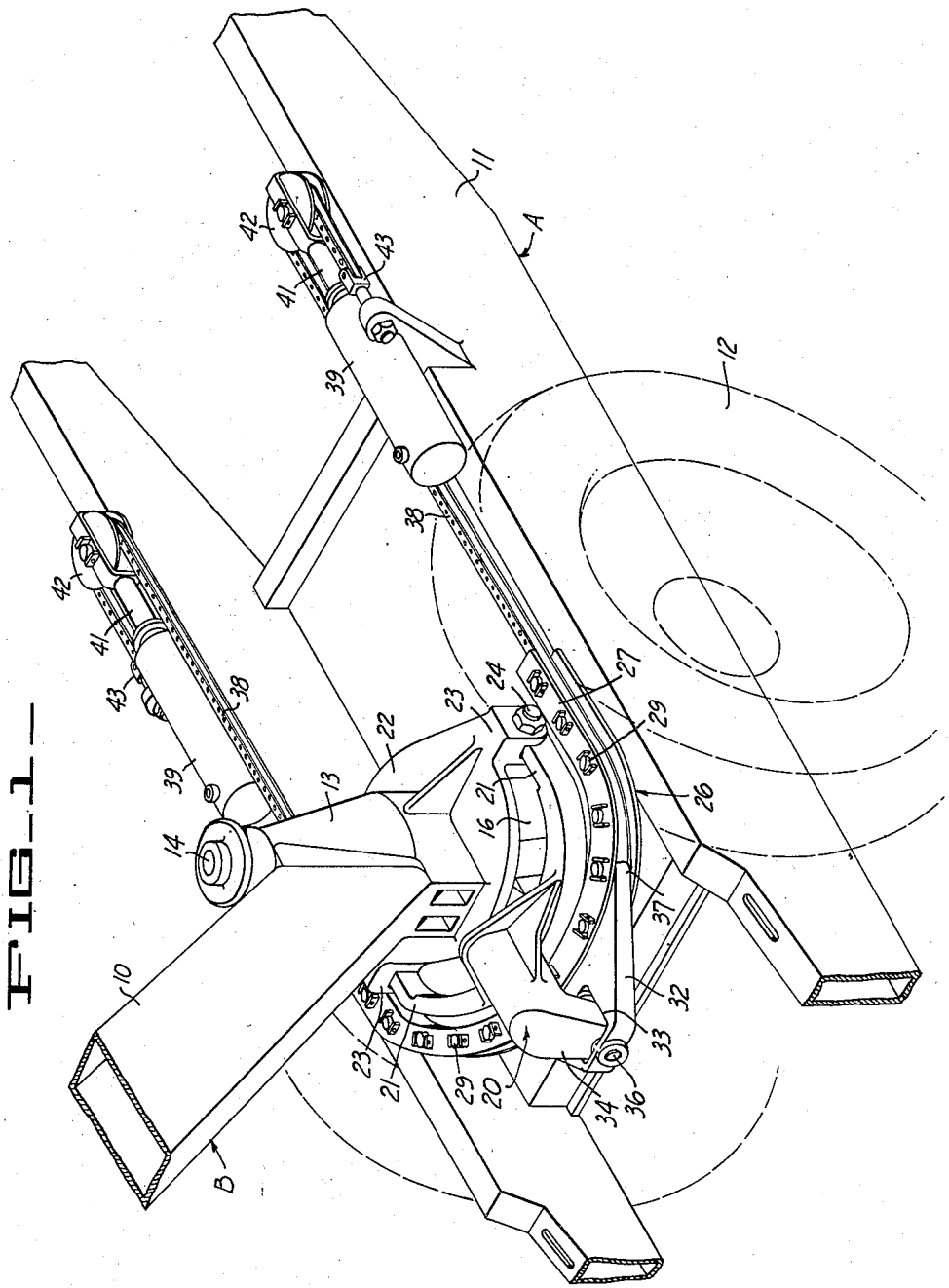
INVENTOR.
John E. Richter
BY
ATTORNEYS April 27, 1954  J. E. RICHTER  2,676,664
STEERING APPARATUS FOR MOTOR POWERED VEHICLES
Filed Feb. 25, 1952  2 Sheets-Sheet 2
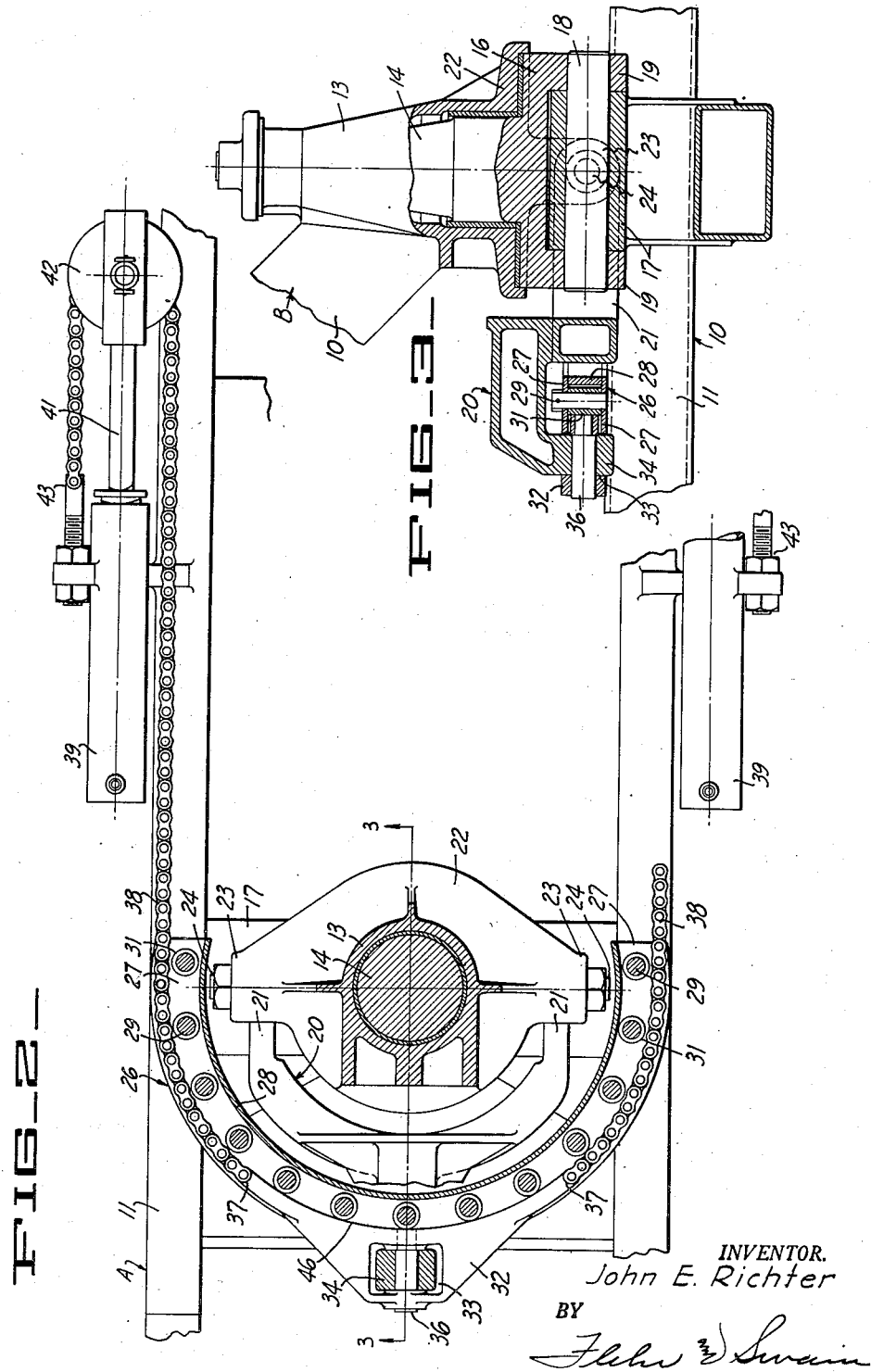
INVENTOR.
John E. Richter
BY
ATTORNEYS

Patented Apr. 27, 1954

2,676,664

UNITED STATES PATENT OFFICE 2,676,664

STEERING APPARATUS FOR MOTOR POWERED VEHICLES

John E. Richter, San Jose, Calif., assignor to Wooldridge Manufacturing Company, Sunnyvale, Calif., a corporation of Nevada Application February 25, 1952, Serial No. 273,200

5 Claims. (Cl. 180—79.4)

This invention relates generally to motor vehicles of the heavy duty type adapted for the handling of relatively heavy loads, and particularly to power operated steering apparatus for such vehicles.

In Clark Reissue 23,251 there is disclosed a steering apparatus for heavy duty vehicles which makes use of coupling means permitting steering movement between the tractor and trailer about a vertical axis, and at the same time permitting the tractor to oscillate about a generally horizontal axis. Adjacent the frame of the tractor there is a steering arm which is pivotally connected to a forward extension of the trailer frame on an axis which is at right angles to the king pin, and transverse to the longitudinal axis of the trailer. An arcuate gateway is carried by the tractor frame, and serves to track sections of a steering chain which extend from hydraulic rams. The free end of the steering arm is attached to the chain, whereby the hydraulic rams serve to apply steering motion about the vertical axis of the king pin, irrespective of oscillating movements of the tractor about a horizontal axis. While the steering arrangement just described has been successfully used in commercial practice, it has been found that under certain severe operating conditions the steering chain is subject to excessive wear and failure. Observations have shown that the point where the excessive wear and failure is most apt to occur is in the connection between the chain sections and the free end of the steering arm. While this difficulty can be alleviated by the use of heavier chains for a machine of a given size, this expedient is not always desirable and may add materially to the cost of the machine, and to its repair.

It is an object of the present invention to provide a machine of the above character with a steering means constructed in a novel manner to minimize wear upon the sections of the steering chain.

Another object of the invention is to provide an improvement as described above which facilitates and lessens the cost of making repairs.

Additional objects and features of the invention will appear from the following description in which the preferred embodiment of the invention has been set forth in detail in conjunction with the accompanying drawing.

Referring to the drawing:

Figure 1 is a perspective view illustrating the steering means in accordance with the present invention.

Figure 2 is a plan view of the parts of the machine shown in Figure 1.

Figure 3 is a sectional detail taken on the line 3—3 of Figure 2.

A complete machine in accordance with the present invention includes the tractor unit A, together with the trailer unit B. The trailer unit can be in the form of an earth scraper adapted to dig, carry and discharge earth, as shown, for example, in said Clark Reissue 23,251. The trailer frame has a forward extension 10 or draft unit, for coupling of the frame to the tractor.

The tractor unit A can likewise be constructed as disclosed in Clark Reissue 23,251, and includes the main frame 11, carried by the driving wheels 12. As disclosed in said reissue, the main frame can carry a suitable driving motor, which is operatively connected to the wheels 12 through transmission gears, a clutch, and a differential which applies the power to the wheels.

The coupling means between the trailer and tractor unit is constructed as follows: The trailer extension 10 is provided with a hub 13, which serves to journal the vertical king pin 14. The lower end 16 of the king pin, below the hub 13, is pivotally attached to a cross beam 17, forming a part of the tractor frame. Thus a pin 18 extends through the cross beam 17, and has its ends engaged by ears 19, depending from the lower end 16 of the king pin. The axis of pin 18 is parallel to the longitudinal axis of the tractor. Normally the tractor frame, and the pin 18, is substantially horizontal.

It will be evident that the king pin permits turning of the tractor about a vertical axis with respect to the trailer. The connection between the lower portion of the king pin and the frame of the tractor (i. e. pin 18) permits the tractor to oscillate about a horizontal axis for any steering position.

The lower portion of hub 13 serves to mount a free floating steering arm 20. This arm is in the form of a yoke with side branches 21 which extend on opposite sides of the hub. A rigid plate 22 is mounted upon the lower end of the hub, and has depending ears 23 which are connected by pivot pins 24 to the corresponding extremities of the branches 21. Pins 24 are aligned on a common axis, and this axis intersects the vertical axis of the king pin, and is at right angles thereto. Also the common axis of pins 24 is horizontal and transverse to the longitudinal axis of the tractor. It will be evident that the arm 20 is free to swing or float in a plane which is normally vertical and coincident with the longitudinal axis of the trailer.

The tractor frame serves to mount a guideway 26, which is arcuate in form as shown in Figure 2. This guideway can consist of vertically spaced arcuate plates 27, secured as by welding to the arcuate spacer plate 28. The plates 27 serve to mount pins 29, which serve to journal the guide rollers 31. The guideway is disposed in a plane which is generally horizontal, and which is substantially coincident with the axis of the pin 18.

The guideway is engaged by the steering bar 32, which has an opening 33 to accommodate the end portion 34 of the steering arm, and is pivotally attached to portion 34 by pin 36. The extremities 37 of the bar 32 are attached to the steering chains 38. These chains also engage the guideway, and extend longitudinally of the tractor frame for operative connection with suitable motion applying means, such as the hydraulic rams 39. The hydraulic rams in this instance are rigidly secured to the frame of the tractor, and the operating piston rods 41 are provided with sheaves 42. The steering chains are engaged over the sheaves 42 and then anchored at 43 to the tractor frame.

A suitable hydraulic system (not shown) is attached to the hydraulic rams 39. Assuming use of a hydraulic system such as disclosed in Clark 23,251, hydraulic fluid under pressure is applied to either one of the two hydraulic rams in accordance with the positioning of a control valve, which in turn is operated by a steering arm or wheel. Thus either one of the two hydraulic rams can be extended, while the other ram is being retracted, or by placing the valve in a neutral position, a given steering angle can be maintained.

The bar 32 is constructed to have sufficient strength to take the pull of the steering chains, and to transmit steering forces to the arm 20. The one face 46 of the bar (Figure 2) is arcuate and concave to engage the peripheries of the guide rollers 31. Also the bar, or at least the edge portion of the same adjacent to the surface 46, is vertically dimensioned to permit the bar to be accommodated between the arcuate plates 27.

Operation of the machine described above is as follows: It will be evident that motion applied by the hydraulic rams 39 will serve to turn the tractor with respect to the trailer. While steering motion is taking place the bar 32 moves about the guideway 26, and transmits force from the two steering chains to the free end of the steering arm 20. Oscillating movement of the tractor about a horizontal axis due to uneven ground over which the machine is travelling, is accommodated by turning of the bar 32 about the pin 36. If such oscillating movement takes place when the tractor is turned at a substantial angle to the longitudinal axis of the trailer, then the steering arm 20 moves in a vertical direction about the pivot pin 24, to accommodate such oscillations. The points of connection between the chains and the bar 32 are spaced a substantial distance from the steering arm, and it has been found that portions of the chain adjacent the extremities of the bar 32 are not subject to excessive wear or failure, the same as if the chains were directly connected to the steering arm.

While I have referred to the use of steering chains for transmitting motion from the hydraulic rams to the bar 32, it will be evident that cables or like flexible elements can be used instead of chains, or I may use a series of articulated links, forming the equivalent of the steering chains.

It will be evident from the foregoing that I have provided a machine which overcomes the difficulties previously mentioned, namely excessive wear and breakage of the steering chains. The design for a machine of a particular size and capacity will not require the use of steering chains of excessive strength, in order to avoid excessive wear or breakage.

I claim:

1. In a motor powered vehicle, a wheeled tractor having a frame, a wheeled trailer having a frame, means for coupling the frame of the tractor to the trailer frame comprising a hub carried by the frame of the trailer, a generally upright king pin journalled in the hub, and a pivotal connection between the king pin and the tractor frame, said king pin permitting steering motion between the tractor and the trailer about a vertical axis and said pivotal connection permitting oscillating movements of the tractor relative to the trailer about the longitudinal axis of the tractor, a steering arm pivotally attached to the hub on a horizontal axis at right angles to the axis of the king pin and transverse to the longitudinal axis of the trailer, an arcuate guideway carried by the tractor frame, a rigid bar pivotally attached to the free end of the arm at a point intermediate its ends and extending for a substantial arcuate distance along said guideway, and means attached to the free ends of the bar and engaging said guideway for applying steering forces between the tractor and the steering arm.

2. In a motor powered vehicle, a wheeled tractor having a frame, a wheeled trailer having a frame, means for coupling the frame of the tractor to the trailer frame comprising a hub carried by the frame of the trailer, a generally upright king pin journalled in the hub, and a pivotal connection between the king pin and the tractor frame, said king pin permitting steering motion between the tractor and the trailer about a vertical axis and said pivotal connection permitting oscillating movements of the tractor relative to the trailer about the longitudinal axis of the tractor, a steering arm pivotally attached to the hub on a horizontal axis at right angles to the axis of the king pin and transverse to the longitudinal axis of the trailer, an arcuate guideway carried by the tractor frame, a rigid bar pivotally attached to the free end of the arm at a point intermediate its ends and extending for a substantial arcuate distance along said guideway, articulated members attached to the free ends of the bar and engaging said guideway, and means for applying steering forces to said articulated member.

3. In a motor powered vehicle, a wheeled tractor having a frame, a wheeled trailer having a frame, means for coupling the frame of the tractor to the trailer frame comprising a hub carried by the frame of the trailer, a generally upright king pin journalled in the hub, and a pivotal connection between the king pin and the tractor frame, said king pin permitting steering motion between the tractor and the trailer about a vertical axis and said pivotal connection permitting oscillating movements of the tractor relative to the trailer about the longitudinal axis of the tractor, a steering arm pivotally attached to the hub on a horizontal axis at right angles to the axis of the king pin and transverse to the longitudinal axis of the trailer, an arcuate guideway carried by the tractor frame, a rigid bar of substantial length pivotally attached to the end of the arm at a point intermediate its ends, said bar having a concave arcuate face engaging a segment of said guideway, articulated members attached to the free ends of the bar and engaging said guideway, and means for applying steering forces to said articulated members.

4. In a motor powered vehicle, a wheeled tractor having a frame, a wheeled trailer having a frame, means for coupling the frame of the tractor to the trailer frame comprising a hub carried by the frame of the trailer, a generally upright king pin journalled in the hub, and a pivotal connection between the king pin and the tractor frame, said king pin permitting steering motion between the tractor and the trailer about a vertical axis and said pivotal connection permitting oscillating movements of the tractor relative to the trailer about the longitudinal axis of the tractor, a steering arm pivotally attached to the hub on a horizontal axis at right angles to the axis of the king pin and transverse to the longitudinal axis of the trailer, an arcuate guideway having circumferentially spaced rollers carrier by the tractor frame, a rigid bar of substantial length pivotally attached to the free end of the arm at a point intermediate its ends, said bar having an arcuately contoured face engaging a plurality of said rollers on each side of said pivotal point, articulated members attached to the free ends of the bar and engaging said guideway, and means for applying steering force to the said articulated members.

5. A machine as in claim 2 in which the articulated members are link chains and in which the bar has a length many times greater than the length of the individual links.

References Cited in the file of this patent
UNITED STATES PATENTS

| Number | Name | Date |
|---|---|---|
| Re. 23,251 | Clark | Aug. 1, 1950 |
| 2,362,262 | French | Nov. 7, 1944 |
| 2,399,278 | Le Tourneau | Apr. 30, 1946 |
| 2,532,786 | Richter | Dec. 5, 1950 |